United States Patent [19]
Weismann

[11] Patent Number: 4,817,451
[45] Date of Patent: Apr. 4, 1989

[54] CONTROL MECHANISM FOR SELECTIVE ENGAGEMENT OF A FREE WHEELING ENGAGEMENT MECHANISM

[76] Inventor: Peter H. Weismann, 1631 Indus St., Santa Ana, Calif. 92707

[21] Appl. No.: 19,217

[22] Filed: Feb. 26, 1987

[51] Int. Cl.⁴ ............................................. F16H 3/10
[52] U.S. Cl. ...................................... 74/333; 192/47; 192/48.92
[58] Field of Search ...................... 74/324, 333, 336 R, 74/337.5; 192/38, 41 R, 45, 47, 72, 48.92, 66, 99 R, 99 A

[56] References Cited
U.S. PATENT DOCUMENTS

| 2,051,386 | 8/1936 | Murray | 192/44 |
| 2,061,288 | 11/1936 | Murray | 192/48.92 |
| 2,865,228 | 5/1954 | Weismann | 74/650 |
| 3,283,611 | 11/1966 | Weismann et al. | 74/650 |
| 3,388,779 | 6/1968 | Roper | 192/45 X |
| 3,426,874 | 2/1969 | Johnston | 192/38 |
| 3,949,848 | 4/1976 | Fogelberg | 192/38 |
| 4,111,288 | 9/1978 | Fogelberg | 192/38 |

Primary Examiner—Leslie A. Braun
Assistant Examiner—Dwight G. Diehl
Attorney, Agent, or Firm—Lyon & Lyon

[57] ABSTRACT

A transmission having engagement mechanisms which employ an engagement inner having cam surfaces forming the race thereof, an engagement outer having a circular outer race and rollers therebetween. A cage mechanism angularly positions the rollers such that they may be wedged between the cam surfaces and the outer face so as to interlock the engagement inner and outer. Actuator mechanisms are employed which are axially movable to engage and angularly position the cages relative to the engagement inner for controlling the engagement mechanism. A plurality of control systems both electronic and mechanical control the operation of the engagement mechanism so as to require substantially synchronous movement between engaging elements.

35 Claims, 7 Drawing Sheets

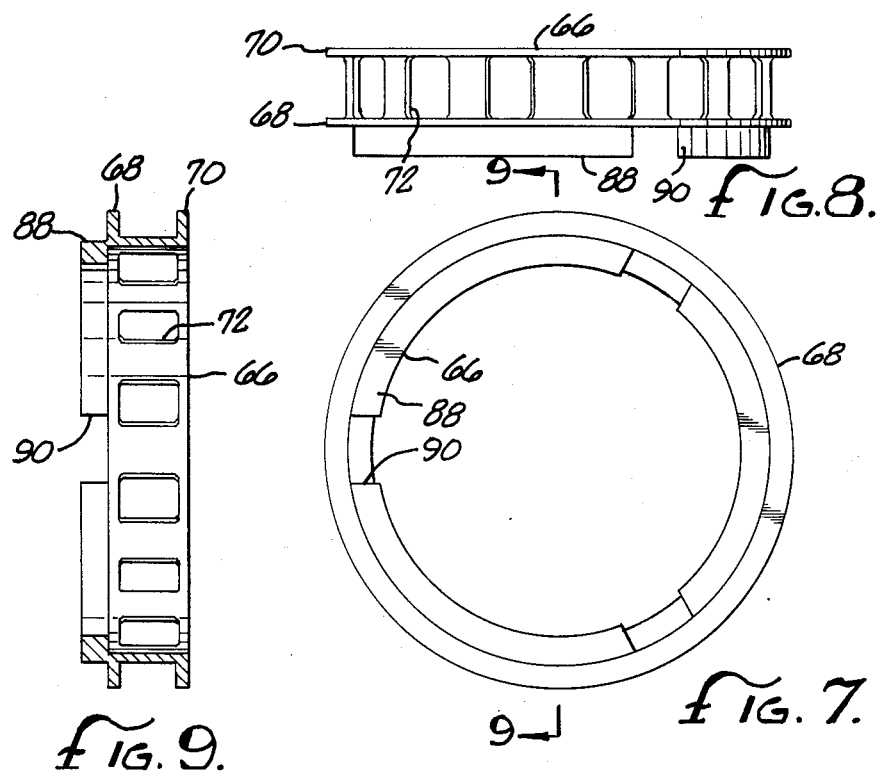
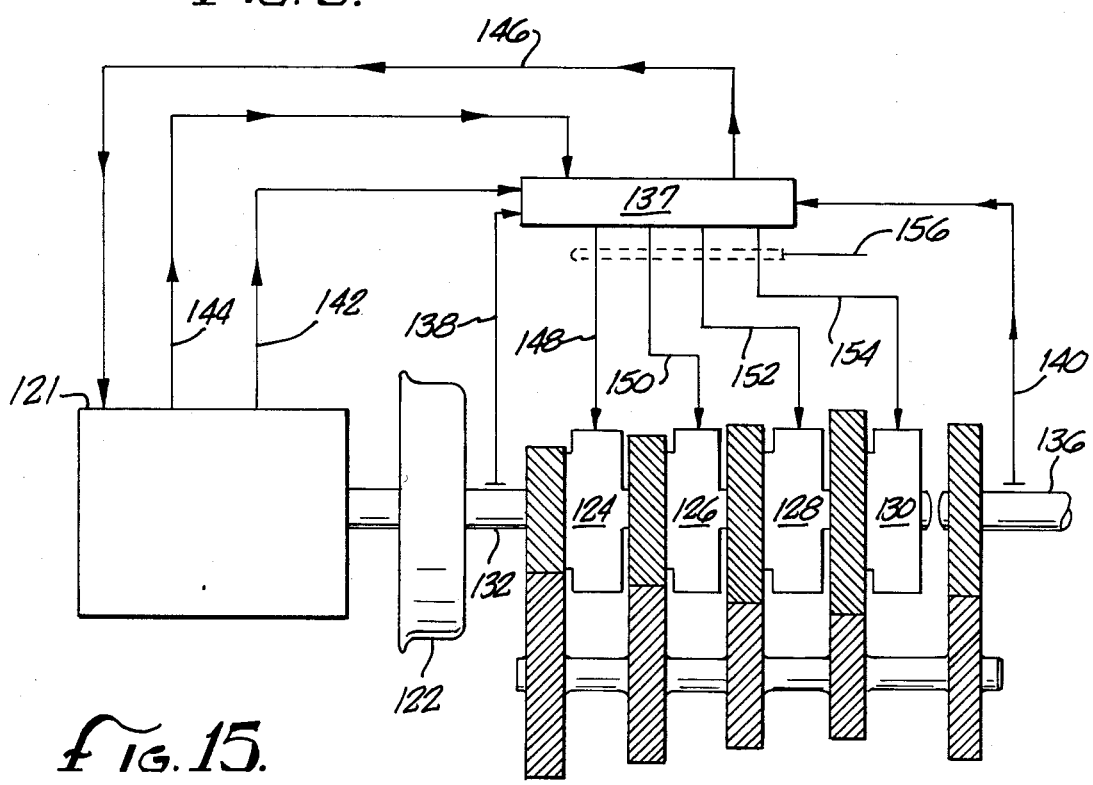

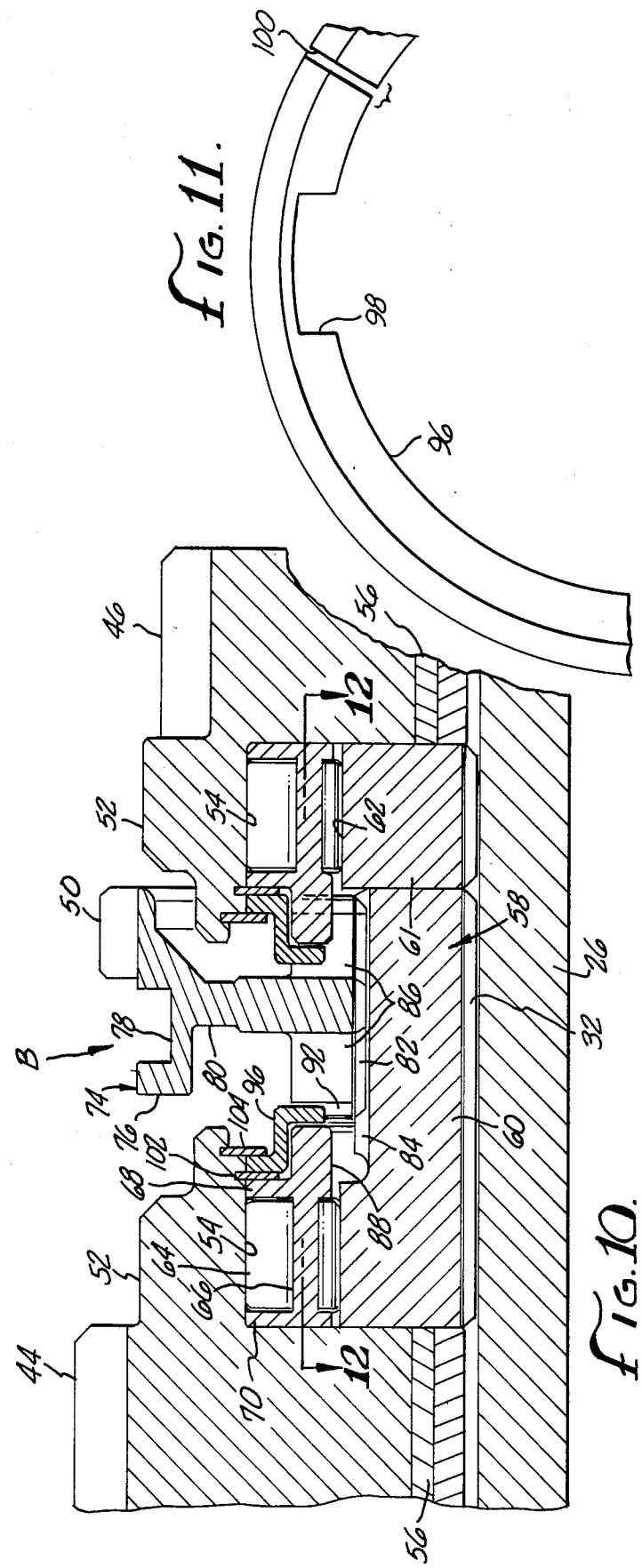

CONTROL MECHANISM FOR SELECTIVE ENGAGEMENT OF A FREE WHEELING ENGAGEMENT MECHANISM

BACKGROUND OF THE INVENTION

The field of the present invention is mechanical devices for selectively engaging rotary elements.

A wide variety of devices have long been available for mechanical engagement of rotating components. Where such engagement is to occur with the elements rotating, a variety of coupling mechanisms are frequently employed. In vehicle transmissions, clutches, fluid couplings, friction bands and synchronizing rings are typical. In many circumstances, these devices are quite adequate. However, many such devices are subject to power loss, rapid wear, lack of sufficient engaging strength and lack of sufficient engaging speed and require some sort of declutching mechanism or input power disruption.

A mechanism for automatically locking components has been employed which provides rapid engagement, very substantial engaging strength, and extended wear. This device employs an engagement inner having an inner race, an engagement outer having an outer race and rollers therebetween. One of the two races has cam surfaces which are inclined relative to the other race. The rollers are set within a cage which generally rotates with the cam surfaces. A slight rotation of the cage relative to the cam surfaces results in selected engagement or disengagement of the inner and outer elements through wedging or releasing of the rollers. This device is disclosed in U.S. Pat. No. 3,283,611 to Weismann et al., entitled Positive Drive Differential. The disclosure of the Weismann et al. patent is incorporated herein by reference.

In the Weismann et al. patent, automatic engagement of the mechanism occurs when differential speeds are experienced by the mechanism. However, employment of such a roller cam engagement mechanism with selective engagement and disengagement has alluded practical utility. The components exhibit substantially inelastic impact when coupling and, under certain circumstances, can experience repeated bouncing out of wedging engagement. Further, the engagement can be so rapid that damage might be done to other components in the rotating power train. Proper control of the cage such that it will remain properly oriented relative to the cam surfaces and yet remain selectively controllable for engagement and disengagement has also proven difficult.

SUMMARY OF THE INVENTION

The present invention is directed to an engagement mechanism employing an engagement inner, an engagement outer and wedgeable elements positioned therebetween. A cage is employed to control the wedgeable elements and cam surfaces are associated with one of the engagement inner and the engagement outer. An actuator cooperates with the cage to selectively position the cage relative to the cam surfaces such that the wedging elements are either engaged or disengaged so as to couple or uncouple, respectively, the engagement inner with the engagement outer. To this end, actuator portions on both the actuator and the cage cause relocation of the cage with selected movement of the actuator. In this way, control may be exercised over such a locking mechanism.

In another aspect of the present invention control means may be employed for either mechanically or electronically preventing a coupling of the engagement inner and the engagement outer without such components being relatively synchronized. Means may be provided to sense a substantially synchronous condition. The wedging elements between the engagement inner and the engagement outer can then be activated to positively couple the mechanism.

With the foregoing control mechanisms, the wedging mechanism operating as an engagement device may be employed in a substantial variety of devices such as multi-speed transmissions as well as clutching mechanisms for rotating couplings in stationary equipment. When employed in mechanisms for shifting gears, such as an automobile transmission, no separate clutching mechanism need be employed for shifting.

Accordingly, it is an object of the present invention to provide an improved mechanical engagement mechanism. Other and further objects and advantages will appear hereinafter.

BRIEF DESCRIPTION OF THE DRAWINGS

FIG. 7 is an end view of a roller cage of the present invention.

FIG. 8 is a plan view of the roller cage of FIG. 7.

FIG. 9 is a cross-sectional view taken along line 9—9 of FIG. 7.

FIG. 10 illustrates in detailed cross section a portion of the device as seen in FIG. 1.

FIG. 11 is an end view of a control member.

FIG. 15 is a schematic view of a transmission and electronic control system incorporating the present invention.

DETAILED DESCRIPTION OF THE PREFERRED EMBODIMENTS

Figure 1:
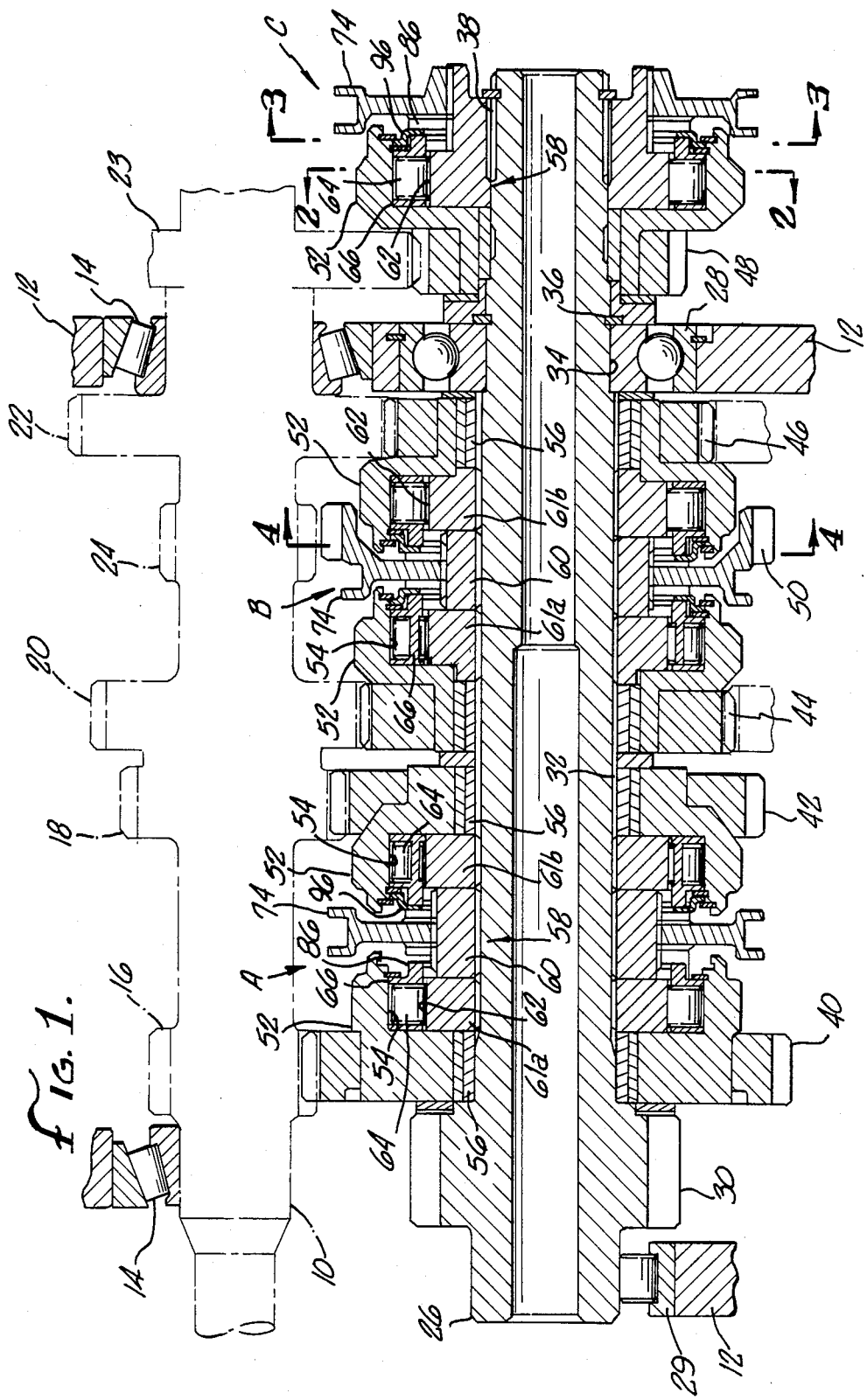
FIG. 1 is a cross-sectional view of portions of a five speed transmission incorporating the present invention.

Turning in detail to the drawings, FIG. 1 illustrates a five speed transmission incorporating the features of the present invention. The transmission includes an input shaft 10 having a cluster gear assembly. The shaft 10 is shown to be rotatably mounted in the transmission casing 12 by bearing mechanisms 14. The cluster gear includes a first gear wheel 16, a second gear wheel 18, a third gear wheel 20, a fourth gear wheel 22 and a fifth gear wheel 23. A reverse gear wheel 24 is also located on the cluster gear.

Also included within the transmission is an output shaft 26 which is shown to be rotatably mounted in the transmission case 12. A ball bearing 28 and a roller bearing 29 are illustrated mounting the output shaft 26. The output shaft 26 is shown to include a final drive output pinion 30. Running a substantial length of the shaft 26 are splines 32. An area 34 of reduced diameter is also provided on the surface of the output shaft 26 to receive the bearing 28 in association with a spring clip 36. Additional splines 38 extend at the end of the output shaft 26.

A plurality of elements are mounted on the output shaft 26 including engagement mechanisms and associated gear wheels. There are three sets of engagement mechanisms, A, B, and C. Each of these mechanisms has substantial similarity such that identical and equivalent components of each of these engagement mechanisms will be referred to by the same reference numerals. Certain differences do exist between the engagement mechanisms A, B and C. These differences will be specifically pointed out where appropriate. The gear wheels incorporated on the output shaft 26 are coupled with the gear wheels 16 through 24 to provide five speeds forward and one speed in reverse. The first gear is provided by the gear wheel 16 on the input shaft 10 in constant meshing engagement with a first gear wheel 40 located on the output shaft 26. Similarly, the second gear wheel 18 on the input shaft 10 is in constant meshing engagement with a second gear wheel 42 on the output shaft 26. Similarly, third gear wheel 20 fourth gear wheel 22 and fifth gear wheel 23 are in constant meshing engagement with third gear wheel 44 fourth gear wheel 46 and fifth gear wheel 48, respectively, on the output shaft 26. A reverse gear wheel 50 is found to be associated with a portion of the engagement mechanism B. The reverse gear 50 is selectively coupled with the reverse gear 24 on the input shaft 10 through a idler gear which is not shown. In this way, reverse rotation is accomplished.

Looking then specifically to the engagement mechanisms, an enlarged drawing of engagement mechanism B is illustrated in FIG. 10. FIG. 10 differs slightly from FIG. 1 in that the gear wheels 44 and 46 are found to be integral with the underlying component while in FIG. 1 separate elements are employed. Clearly, the selection of either a unitary or composite component is a design choice. In FIG. 10, the gear wheel 44 is shown to incorporate an engagement outer 52. The engagement outer 52 constitutes a cylindrical portion extending axially from the gear wheel portion. A similar cylindrical portion 52 is associated with the gear wheel 46. This engagement outer 52 associated with the gear wheel 46 extends axially in the opposite direction from that of the engagement outer on the gear wheel 44. Each of the engagement outers 52 defines a circular outer race 54. The circular outer races 54 are arranged concentrically about the axis of the output shaft 26. Each of the gear wheels 44 and 46 are mounted on bearings 56 such that they and the outer races 54 may rotate freely at differing speeds. This enables the gears to be in constant meshing arrangement with the associated gear cluster on the input shaft 10 when each of the gears 16-24 rotate together.

Figure 2:
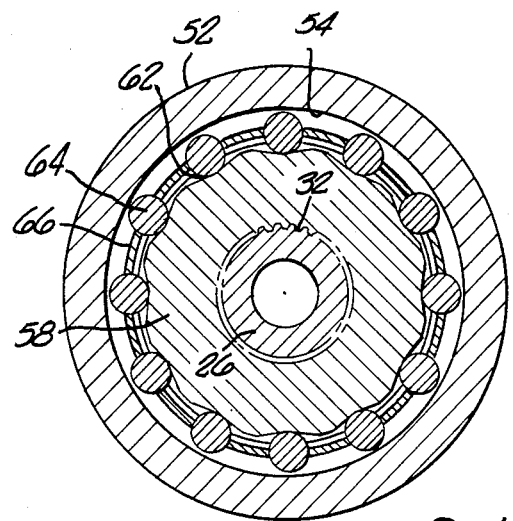
FIG. 2 is a cross-sectional view taken along line 2—2 of FIG. 1.
Figure 3:
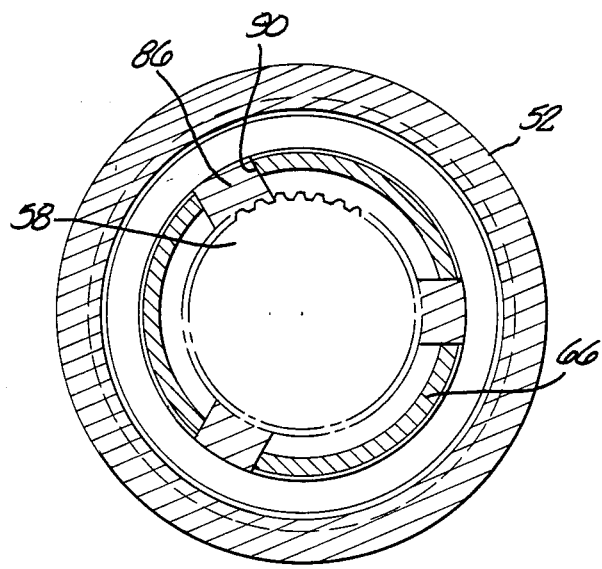
FIG. 3 is a cross-sectional view taken along line 3—of FIG. 1.
Figure 4:
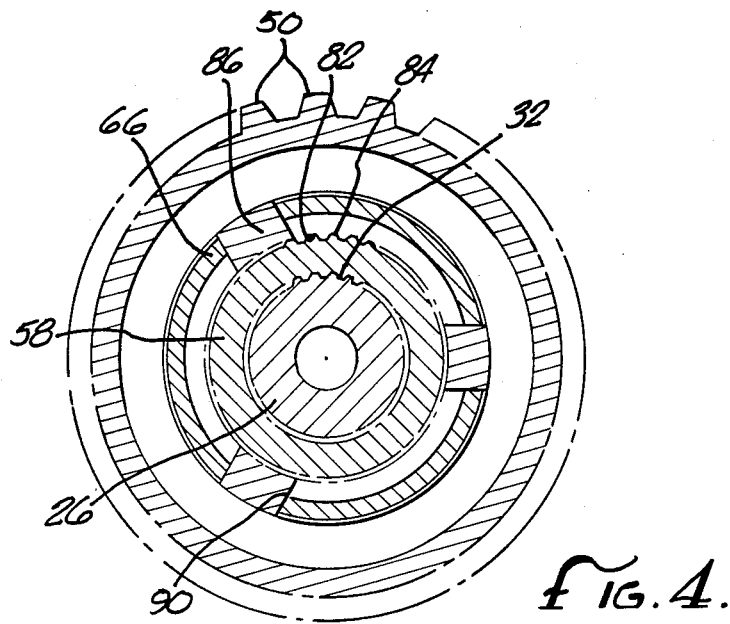
FIG. 4 is a cross-sectional view taken along line 4—4 of FIG. 1.

Located between the engagement outers 52 and fixed to rotate with the output shaft 26 is an engagement inner 58. The engagement inner 58 is shown to be a composite of two ring members 60 and 61 in FIG. 10 which are both internally splined to mate with the splines 32 on the output shaft 26. A design choice variation is illustrated in FIG. 1 where the engagement inner 58 is comprised of three ring members 60, 61a and 61b. The engagement inner 58 is provided with two inner races 62. The profile of the inner races is best illustrated in FIG. 2. The inner races 62 define a plurality of cam surfaces which are inclined relative to the outer races. Two upwardly and outwardly extending cam surfaces are associated with a common depression at a plurality of locations around the inner race (twelve being illustrated in FIG. 2). Each of these surfaces or engagement ramps has an angle of inclination relative to the local tangent of from approximately 2 degrees to 12 degrees. The ramp surfaces thus approach the circular outer race 54 as they extend outwardly from the central depression between paired ramps. This relationship is employed as a means to effect a wedging function to couple the engagement inner and engagement outer.

Located between the outer races 54 and the inner races 62 are wedging elements. The wedging elements in the preferred embodiment are shown to be cylindrical rollers 64. These cylindrical rollers 64 are sized such that they do not contact both the central depression between paired cam surfaces and the outer race at the same time. However, the rollers are also sized such that as they roll up one or the other of the cam surfaces to either side of the central recess, they then engage both the cam surface and the outer race at the same time. Given a relatively shallow angle between the inner and outer races at the contact point with each roller 64, the rollers are wedged between the two races and the races then act as one while one engagement member continues to drive the other engagement member in the same direction. When the driving race decelerates, the rollers may be released. With the rollers in the released condition, the inner and outer races 62 and 54 are uncoupled and rotate freely relative to one another until engagement is again established, most likely on the paired cam surfaces opposite to those originally engaged if deceleration continues.

To provide control over the rollers 64 and to provide uniform engagement and disengagement of the rollers 64 with the races 54 and 62, a cage 66 extends concentrically between the races 54 and 62. The cage 66 is separately illustrated in FIGS. 7, 8 and 9. The cage 66 includes radially extending flanges 68 and 70. These flanges 68 and 70 locate the cage relative to the outer, cylindrical race 54 such that the cage 66 may remain concentric within the engagement mechanism. Located about the cage 66 between the flanges 68 and 70 are holes 72. The holes 72 are each sized to receive a roller 64. As can be seen in FIG. 2, the rollers are appropriately positioned about the inner race 62 so that the rollers may all be identically placed relative to the cam surfaces. Therefore, rotation of the cage 66 in one direction or the other will cause all of the rollers to climb a cam surface so as to engage the outer race 54 if it is rotating at a differential speed to that of the inner race 62.

Located between the cages 66 is an actuator, generally designated 74. Each of the actuators 74 includes a shift ring 76 having a circumferential groove 78 to receive conventional shifting forks. Inwardly of the shift ring 76 the actuator includes a body 80 having a central bore therethrough with splines 82 to mate with splines 84 located on the outer surface of the engagement inner 58. Thus, the actuator 74 may move axially relative to the engagement inner 58 but must move rotationally therewith.

Figure 5:
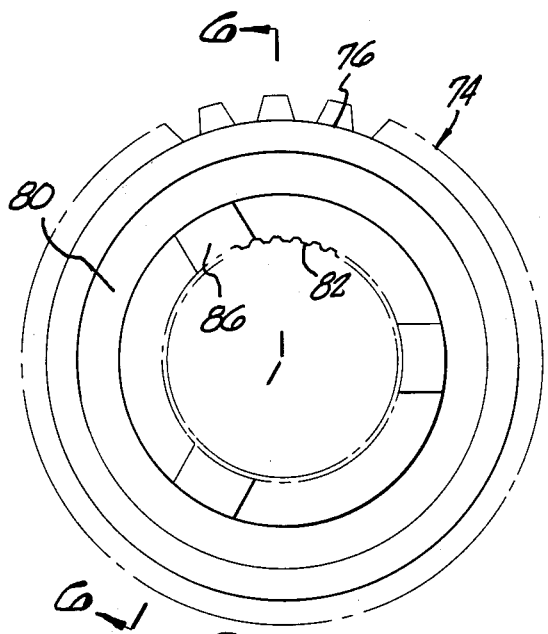
FIG. 5 is an end view of an actuator of the present invention.
Figure 6:
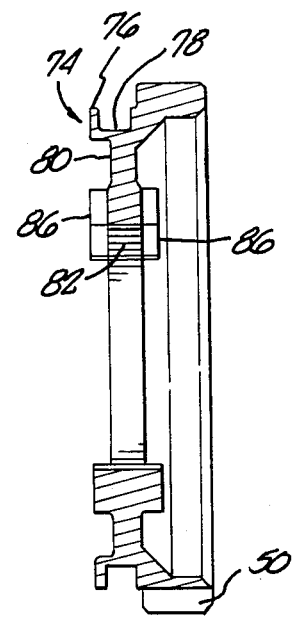
FIG. 6 is a cross-sectional view taken along lines 6—6 of FIG. 5.

Extending laterally from the body 80 of the actuator 74 is an actuator portion 86. The actuator portion 86 in the present embodiment is illustrated to be a dog mechanism extending from the body 80 in the axial direction of the output shaft. There are shown to be three dogs 86 equiangularly located on one side of the actuator body 80. The actuator associated with the engagement mechanism B is illustrated in FIGS. 5 and 6. In both of the engagement mechanisms A and B, there are two sets of actuator portions 86 associated with each actuator 74, one to each side of the actuator body 80. In engagement mechanism C, only one such set of actuator portions 86 is employed.

Cooperating with the actuator portion 86 of the actuator 74 is an actuator portion 88 located on the cage 66. The actuator portion 88 forms a cylindrical flange having slots 90 at three locations equiangularly spaced about the flange 88. These slots 90 cooperate with the dogs or actuator portions 86 to selectively engage and disengage with movement of the actuator 74. This cooperation may be seen in side view in FIG. 10 where the right dog 86 is shown to be engaged with a slot of the flange 88. The left dog 86 is not so engaged. This positioning is illustrated in plan in FIG. 12A. The right cage 66 is shown to be angularly held by the associated dog positioned in the slot. The left cage 66 is shown to be displaced from an alignment between the left dog and the left slot. FIG. 12C illustrates the dogs centrally positioned such that both slots 90 are engaged. FIG. 12F illustrates the reverse of FIG. 12A with the shift completed. FIG. 12B and the sequence include FIGS. 12A, B and C illustrate the cooperation between the left dog 86 and slot 90. Associated with the first dog or actuator portion 86 is a beveled surface 92 with a similar beveled surface 94 associated with the slot 90. These beveled surfaces 92 and 94 are inclined to the direction of relative movement between the actuator 74 and the cage 66. Consequently, a camming action is shown to take place as seen from the sequence of FIGS. 12A, B and C. This action aligns the dogs 86 and slots 90 which in turn angularly position the entire cage 66.

Associated with the engagement mechanisms are control means for preventing disengagement of the actuator portions. In the embodiment of FIG. 1 and FIG. 10, each of the paired dogs 86 and slots 90 are shown to have a control member 96 located between the actuator 74 and the cage 66. These control members 96 are shown to be rings one of which is partially illustrated in FIG. 11. Each of the rings 96 includes ports 98 which align with the dogs 86 to allow movement therethrough. The rings may be split at 100 and spring biased to create appropriate friction for urging of the ring 96 against the rotating engagement outer. The rings 96 are held axially relative to each of the engagement outers by spring clips 102 and 104. The operation of the control means is best illustrated in FIG. 12. The actuator portions 86 of the actuators 74 include undercut portions 106 inwardly of the inclined surfaces 92. The undercut portions define an engagement shoulder 108 which faces away from the cage 66. The control member 96 at the edge of the ports 98 defines locking shoulders to engage the engagement shoulders of the control members 96. As illustrated in FIG. 12D, under certain circumstances, the locking shoulders and engagement shoulders cooperate to prevent retraction of the actuator portions 86.

Looking again to FIG. 1, certain differences are apparent among each of the engagement mechanism A, B and C. Engagement mechanism A controls first and second gears. First gear is shown not to employ a control ring 96. The lack of a ring 96 on first gear enables the actuator 74 to be engaged with the associated cage 66 with the vehicle stopped. A conventional control means may be employed to insure against engagement of first gear under inappropriate condition. A conventional lockout mechanism may be employed including a solenoid controlled stop requiring the drive train clutch to be disengaged before first gear may be selected.

Exploring further differences, engagement mechanisms A and B are dual mechanisms each controlling two gears. Engagement mechanism C is shown to be a single control mechanism controlling only fifth gear 48. Finally, engagement mechanism B also incorporates the reverse gear 50 discussed above.

Looking then to the operation of the first embodiment as described in FIGS. 1 through 12, first gear is selected by moving the actuator 74 of the engagement mechanism A to the right as seen in FIG. 1. As stated before, a conventional solenoid mechanism may be employed to prevent such movement unless the drive train clutch is disengaged. As the actuator 74 of the engagement mechanism A is moved to the right, the dog 86 associated with the slot 90 of the cage 66 adjacent the first gear is disengaged. The disengagement allows the cage 66 to rotate relative to the engagement inner 58. This movement of the cage 66 occurs because of the constant meshing of first gear wheel 40 with the associated first gear wheel 16 located on the input shaft. As the gear wheel 40 rotates, sufficent drag is experienced between the cage 66 and the outer race 54 such that the cage 66 and the rollers 64 rotate relative to the engagement inner 58. Only a small degree of rotation is possible before the rollers 64 roll up the associated cam surfaces or ramps bringing the engagement inner 58 and the engagement outer 52 into a mutually engaged relationship. With all of the remaining engagement mechanisms arranged with the actuator 74 engaging the cages 66, only first gear is engaged between the input shaft and the output shaft. Normal power may then be directed through the transmission. Under decelerating conditions, the rollers 64 disengage from the inner and outer races and then instantaneously reengage on the opposite ramp. One may then go through the gears in a like manner.

The engagement inner 58 and the engagement outer 52 may experience inelastic impact when engaging through the rollers 64. Some damping may be provided between the inner 58 and the outers 52 through the fit between components or as described below with reference to FIGS. 13 and 14. This would alleviate the possibility of the engagement mechanism bouncing out of engagement.

FIG. 12, illustrating the engagement mechanism B, provides the greatest detail in the shifting operation. Figure 12A illustrates an initial condition where the engagement mechanism on the left is engaged and the engagement mechanism on the right is disengaged. Engagement occurs when the cage 66 is allowed to rotate relative to the actuator 74 and in turn the engagement inner with its cam surfaces. The dogs 86 and slots 90 are arranged such that when engaged, the rollers 64 are disengaged between the outer race 54 and the inner race 62. It should be noted that the control ring 96 is never disengaged by the dog 86. This arrangement insures that the dog 86 may always fit within the port 98.

Figure 12A:
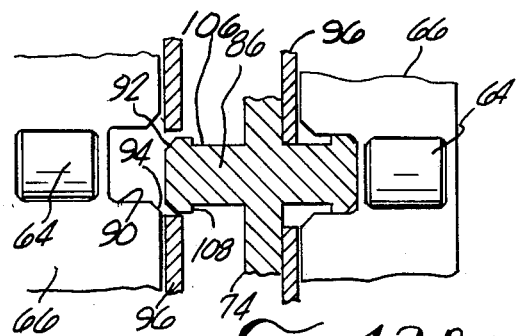
FIGS. 12A through 12F are cross-sectional views taken along line 12—12 of FIG. 10 showing an actuator in a plurality of positions.
Figure 12B:
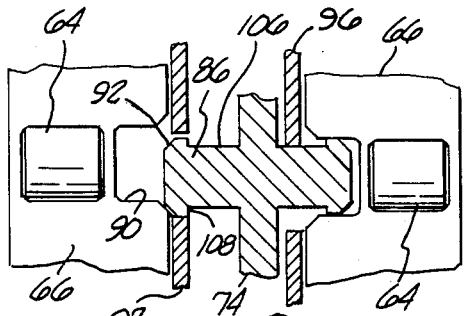
Figure 12C:
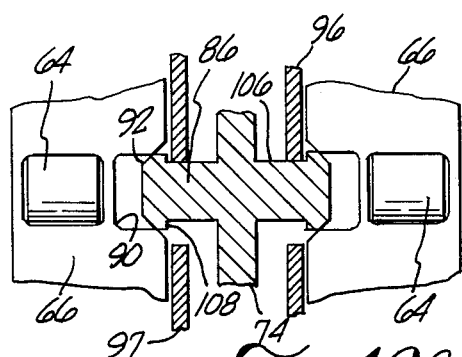
Figure 12D:
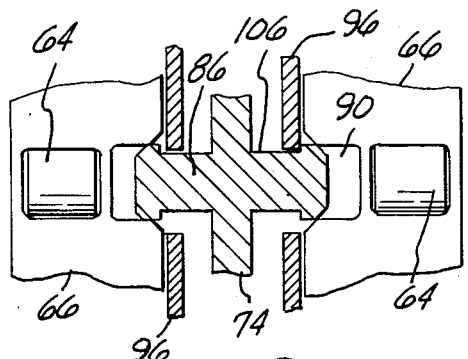
Figure 12E:
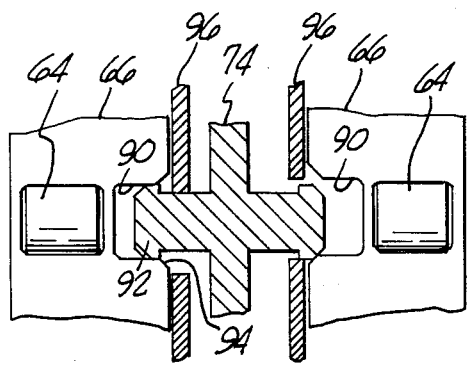
Figure 12F:
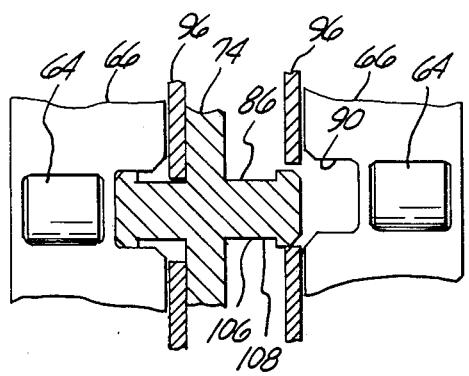

As shifting occurs, in sequence through FIGS. 12A, B and C, the left cage 66 is engaged at the beveled surfaces 92 and 94 and forced into alignment with the dog 86 when input torque is interrupted. At this time, the rollers are positioned between the opposed ramps and the outer race 54 is disengaged.

As shifting continues toward the next gear, the gear on the right in FIG. 12, the control ring 96 is engaged between the locking shoulder and the engagement shoulder to prevent the dog 86 from being retracted from the right slot. This condition will exist until a substantially synchronous condition is reached between the engagement outer 52 and the engagement inner 58. At such time as the rotating engagement elements approach synchronous speed, the control ring 96 will cross from engagement on one side to engagement on the other side of the dog 86. During the interim between engagement, the dog may be retracted from the slot 90 as sequentially illustrated in FIGS. 12D, E and F such that the right-hand engagement mechanism becomes engaged. The control ring 96 is operated under the influence of the friction between the control ring itself and the engagement outer. The control ring is arranged with sufficient friction such that it is biased to move with the associated engagement outer. Such movement is limited by the lack of disengagement between the dogs 86 and each of the control rings 96. However, positive engagement between the locking shoulders and the engagement shoulders can occur until the engagement outer momentarily approaches a synchronous speed with the engagement inner. At this point, the control ring 96 is urged in the opposite angular direction relative to the engagement inner with which the actuator is angularly fixed. At this moment, the engagement between the ring 96 and the dog 86 is relieved and shifting may occur.

To achieve shifting, the conditions controlling the control ring 96 may be left completely to the operator. Under such circumstances backing off the accelerator while shifting will free the appropriate dog for engagement. Electronic means may also be provided to accomplish the same function in association with movement of the shift lever. For example, the ignition may be momentarily disabled during an upshift such that the appropriate conditions exist to unlock the shifting dog.

Figure 13:
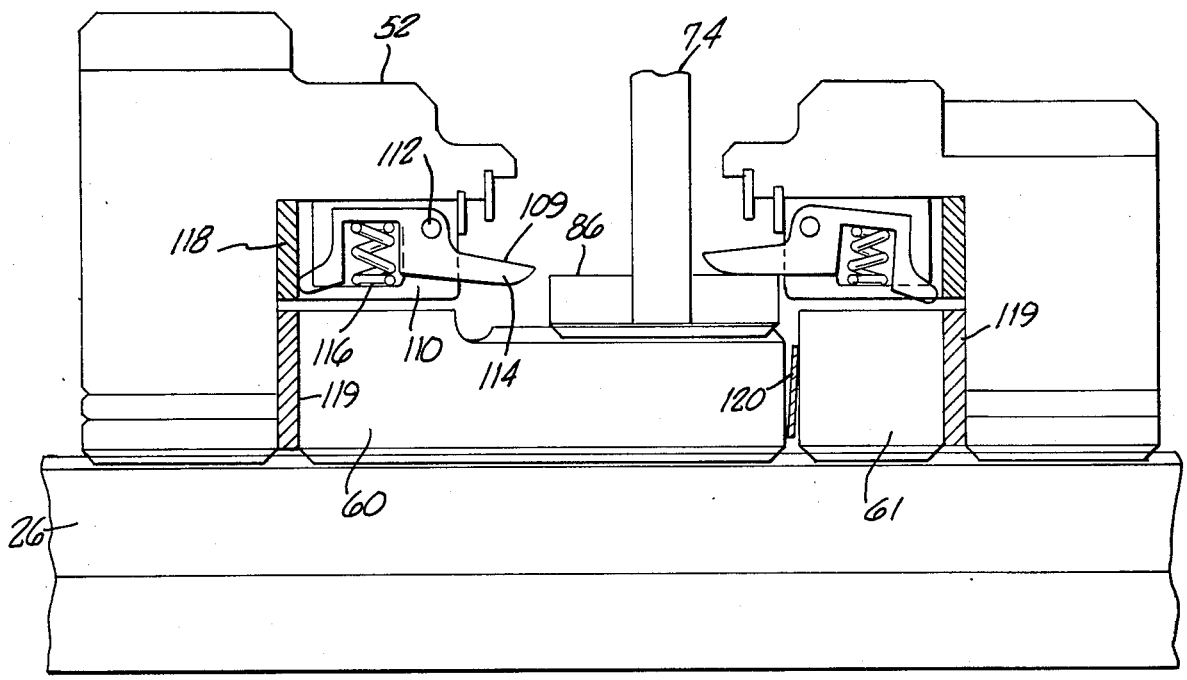
FIG. 13 illustrates an alternate embodiment having a controllable cage drag mechanism in schematic cross section.
Figure 14:
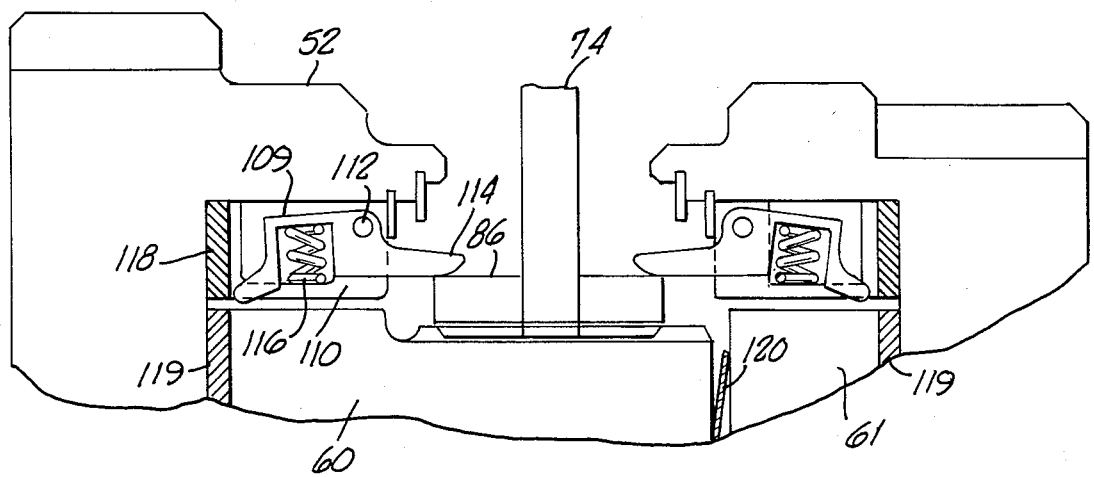
FIG. 14 illustrates the device of FIG. 13 with the actuator reoriented.

Looking next to the embodiment of FIGS. 13 and 14, controllable friction cage drag is illustrated as is constant friction drag between the engagement inner 58 and the engagement outer 52. Under certain harsh engagements, engagement mechanism bouncing can occur causing rapid loading and unloading of the coupling. Supplying a sufficient amount of drag between the cage and the engagement member having the cylindrical race, in this case the engagement outer, or between the engagement inner and engagement outer will critically dampen the oscillation and prompt smooth engagement. This drag, though beneficial upon engagement has a detrimental side effect during the neutral freewheeling condition. That is of wasted horsepower or inefficiency. Hence the device illustrated in FIGS. 13 and 14 shows a means for switching the friction on (L.H. side of FIG. 13) and off (R.H. clutch).

The actuator 74 incorporates an actuating portion 86 to receive a control member 109 pivotally mounted to a cage 110 about a pivot 112. An extension 114 of the control member 109 includes a ramp to be mechanically linked with the portion 86. The mechanism 109 includes a spring 116 to bias the control member 109 into engagement with a friction member 118. When the actuator portion 86 is withdrawn from the control member 109 to release the cage 110, the spring 116 brings the member 109 into engagement with the friction member 118 as can be seen on the left side of FIG. 13. This forces the friction member 118 to engage the engagement outer 52 resulting in drag on the cage. The friction member 118 is keyed to the cage 110. The mechanism 109 is held away from the friction member 118 in the R.H. clutch in FIG. 14 disabling the cage drag mechanism in the neutral freewheeling condition. FIG. 14 illustrates the double neutral position of the shift actuator with both drag devices disabled.

Also illustrated in FIGS. 13 and 14 is constant friction drag between the engagement inner and the engagement outer 52. This is provided by two friction discs 119 located between the left engagement outer 52 and the ring member 60 of the engagement inner 58 and between the right engagement outer 52 and the ring member 61. Controlled normal forces between the friction discs 119 and the associated inner 58 and outers 52 is accomplished by a Belleville spring 120 between ring members 60 and 61. The constant friction drag mechanism may be employed with the controllable friction cage drag. Alternately, one or the other may be employed independently in a design. Further, the fit of the components, such as between the cage 110 and the engagement outer 52, for additional friction elements may be employed to create constant cage drag relative to the engagement outer having the cylindrical race. Each of these mechanisms contributes to avoid any rebounding between components resulting from inelastic impact when engaged.

Looking lastly to FIG. 15, an electronic control system is employed to provide the control means for preventing shifting without the rotating components being substantially synchronized. Schematically illustrated is an engine 121 and a hydraulic coupling or torque converter 122. Actuator mechanisms are illustrated schematically as 124, 126, 128 and 130 and include actuator control mechanisms such as solenoids which can be controlled by electrical input. In this instance, an input shaft 132 mounts the actuator mechanisms. A gear cluster on a lay shaft is shown to be continuously meshing with gear wheels located on the input shaft 132. Output is through a drive shaft 136.

A computer 137, common to the auto industry, is employed to sense input rpm through line 138, output rpm through line 140 and selected conditions of the engine such as engine rpm through line 142 and manifold vacuum through line 144. Several outputs are provided from the computer including an engine control 146 which may control throttle or ignition to establish the appropriate shifting condition and shift commands through lines 148, 150, 152 and 154. Input from a selection mechanism common to automatic transmissions is illustrated schematically at 156.

Thus, an engagement mechanism is disclosed which has the capability of being operated either manually or automatically to provide a lightweight, fast actuating and strong transmission, providing clutchless, low impact shifts and finding utility in a variety of uses including automotive transmissions, machine tools and the like. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. An engagement mechanism comprising
an engagement inner having an inner race;
an engagement outer having an outer race, one of said inner race and said outer race having cam surfaces inclined relative to the other of said inner race and said outer race;
wedging elements between said inner race and said outer race;
a cage between said inner race and said outer race, said cage retaining said wedging elements and being angularly movable relative to said cam surfaces to selectively couple said engagement inner and said engagement outer through said wedging elements, said cage having a first actuator portion;
an actuator angularly fixed relative to said cam surfaced and having a second actuator portion, said actuator being movable relative to said cage to selectively engage said first and second actuator portions to angularly displace said cage relative to said cam surfaces;
a friction member functionally positioned between said cage and the one of said engagement inner and said engagement outer not having said cam surfaces; and
a control member movably mounted on said cage and operatively linked to said actuator to selectively frictionally engage said cage with the one of said engagement inner and said engagement outer not having said cam surfaces.

2. The engagement mechanism of claim 1, wherein in said cam surfaces are on said inner race, said outer race being circular.

3. The engagement mechanism of claim 1, wherein said wedging elements are rollers.

4. The engagement mechanism of claim 1 wherein said first actuator portion and said second actuator portion are surfaces inclined to the direction of relative movement between said actuator and said cage.

5. The engagement mechanism of claim 1 wherein one of said first actuator portion and said second actuator portion is a slot and the other of said first actuator portion and said second actuator portion is a dog positionable in said slot.

6. The engagement mechanism of claim 5 wherein said dog is on said actuator.

7. The engagement mechanism of claim 1 further comprising
a second friction member functionally positioned between said engagement inner and said engagement outer.

8. The engagement mechanism of claim 7 further comprising
means for biasing said engagement inner and said engagement outer against said second friction member.

9. An engagement mechanism comprising
an engagement inner having an inner race;
an engagement outer having an outer race, one of said inner race and said outer race having cam surfaces inclined relative to the other of said inner race and said outer race;
wedging elements between said inner race and said outer race;
a cage between said inner race and said outer race, said cage retaining said wedging elements and being angularly movable relative to said cam surfaces to selectively couple said engagement inner and said engagement outer through said wedging elements, said cage having a first actuator portion;
an actuator angularly fixed relative to said cam surfaces and having a second actuator portion, said actuator being movable relative to said cage to selectively engage said first actuator portion and said second actuator portion to angularly displace said cage relative to said cam surfaces;
control means for preventing disengagement of said actuator portion and said second actuator portion when said engagement inner and said engagement outer are not substantially synchronized, said control means including a control member positioned between said actuator and said cage, said control member having an opening therein, one of said first actuator portion and said second actuator portion being received by said opening and having an engagement shoulder facing away from the other of said first actuator portion and said second actuator portion, said control member having a locking shoulder adjacent said opening to face and selectively interlock with said engagement shoulder.

10. The engagement mechanism of claim 9 wherein said control member is a ring slidably mounted to the one of said engagement inner and said engagement outer which does not have said cam surface.

11. An engagement mechanism comprising
an engagement inner rotatable about an axis and having an inner race;
an engagement outer rotatable about said axis and having an outer race positioned radially outwardly of said inner race, one of said inner race and said outer race being circular about said axis and the other of said inner race and said outer race having cam surfaces inclined relative to the circular one of said inner race and said outer race;
rollers positioned between said inner race and said outer race adjacent said cam surfaces, said rollers being sized to selectively couple said engagement inner and said engagement outer by engagement of said inner race and engagement of said outer race;
a roller cage between said inner race and said outer race, said rollers being positioned in said roller cage and being located angularly about said axis relative to said cam surfaces by said roller cage;
an actuator rotatable about said axis, one of said roller cage and said actuator having at least one slot and the other of said roller cage and said actuator having at least one dog positionable in said slot, said actuator being angularly fixed relative to said engagement inner and being selectively movable relative to said engagement inner along said axis to engage and disengage said dog in said slot, said cage and said rollers being angularly positioned with said dog and said slot engaged such that said engagement inner and said engagement outer are mutually disengaged;
control means for preventing retraction of said dog from said slot when said engagement inner and said engagement outer are not substantially synchronized, said control means including an opening therein to receive said dog and a locking shoulder adjacent said opening and facing said slot to selectively interlock with said locking shoulder, said control member being a ring, said ring slidably mounted to the one of said engagement inner and said engagement outer which does not have said cam surface.

12. The engagement mechanism of claim 11 wherein said cam surfaces are located on said inner race.

13. The engagement mechanism of claim 11 wherein said actuator includes said dog and said roller cage includes said slot.

14. The engagement mechanism of claim 11 wherein said slot includes a first actuator portion and said dog includes a second actuator portion, said first and second actuator portions having mutually engaging surfaces inclined relative to said axis.

15. The engagement mechanism of claim 11 wherein said control member is fixed axially relatively to said slot.

16. An engagement mechanism for a multiratio transmission, comprising
   an engagement inner having a first inner race and a second inner race;
   a first engagement outer having a first outer race;
   a second engagement outer having a second outer race, said outer races being circular and said inner races having cam surfaces inclined relative to said outer races;
   wedging elements between said inner races and said outer races;
   a first cage between said first inner race and said first outer race;
   a second cage between said second inner race and said second outer race, said first cage and said second cage retaining said wedging elements and being angularly couple said engagement inner and said first engagement outer and said engagement inner and said second engagement outer, respectively, through said wedging elements, said first cage and said second cage having a first actuator portion and a second actuator portion, respectively;
   an actuator angularly fixed relative to said cam surfaces and having a third actuator portion and a fourth actuator portion, said actuator being movable relative to each of said cages to selectively engage said first and second actuator portions with said third and fourth actuator portions. Respectively, to angularly displace said cages relative to said cam surfaces;
   a first friction member functionally positioned between said first cage and said first engagement outer;
   a second friction member functionally positioned between said second cage and said second engagement outer;
   a first control member movably mounted on said first cage and operatively linked to said actuator to selectively frictionally engage said first cage with said first engagement outer; and
   a second control member movably mounted on said second cage and operatively linked to said actuator to selectively frictionally engage said second cage with said second engagement outer.

17. The engagement mechanism of claim 16 wherein full engagement of said first actuator portion and said third actuator portion position said first cage to mutually disengage said engagement inner and said first engagement outer and full engagement of said second actuator portion and said fourth actuator portion positions said second cage to mutually disengage said engagement inner and said second engagement outer, at least one or the other or both of said first actuator portion and said second actuator portion are fully engaged with said third actuator portion and said fourth actuator portion respectively.

18. The engagement mechanism of claim 16 further comprising control means for preventing disengagement of said first actuator portion and said third actuator portion when said engagement inner and said first engagement outer are not substantially synchronized and disengagement of said second actuator portion and said fourth actuator portion when said engagement inner and said second engagement outer are not substantially synchronized.

19. The engagement mechanism of claim 16 further comprising a rotatably mounted shaft, said engagement inner being positioned on said shaft and fixed to rotate therewith, said first engagement outer including a first gear rotatably mounted therewith and said second outer includes a second gear rotatably mounted therewith, said first and second gears being different diameters, and a cluster gear including a third gear and a fourth gear thereon in constant meshing with said first gear and said second gear, respectively.

20. An engagement mechanism comprising
   an engagement inner having an inner race;
   an engagement outer having an outer race, one of said inner race and said outer race having cam surfaces inclined relative to the other of said inner race and said outer race;
   wedging elements between said inner race and said outer race;
   a cage between said inner race and said outer race, said cage retaining and wedging elements and being angularly movable relative to said cam surfaces to selectively coupling said engagement inner and said engagement outer through said wedging elements, said cage having a first actuator portion;
   an actuator angularly fixed relative to said cam surfaces and having a second actuator portion, said actuator being movable relative to said cage to selectively engage said first and second actuator portions to angularly displace said cage relative to said cam surfaces;
   a friction member functionally positioned between said cage and the one of said engagement inner and said engagement outer not having said cam surfaces; and
   a control member movably mounted on said cage and linked to said actuator to selectively engage said friction member with the one of said engagement inner and said engagement outer not having said cam surfaces, said friction member being angularly fixed to said cage.

21. An engagement mechanism comprising
   an engagement inner having an inner race;
   an engagement outer having an outer race, one of said inner race and said outer race having cam surfaces inclined relative to the other of said inner race and said outer race;
   wedging elements between said inner race and said outer race;
   a cage between said inner race and said outer race, said cage retaining said wedging elements and being angularly movable relative to said cam surfaces to selectively couple said engagement inner and said engagement outer through said wedging elements, said cage having a first actuator portion;

an actuator angularly fixed relative to said cam surfaces and having a second actuator portion, said actuator being movable relative to said cage to selectively engage said first actuator portion and said second actuator portion to angularly displace said cage relative to said cam surfaces;

control means for preventing disengagement of said first actuator portion and said second actuator portion when said engagement inner and said engagement outer are not substantially synchronized, said control means including a first sensor to sense the speed of said engagement inner, a second sensor to sense the speed of said engagement outer, a computer receiving signals from said first and second sensors, actuator control means operatively controlled by said computer to move said actuator at near synchronous speeds of said engagement inner and said engagement outer.

22. The engagement mechanism of claim 21 wherein said control means further includes a third sensor for sensing an engine operating condition.

23. The engagement mechanism of claim 21 wherein said control means further includes an engine control to establish a near synchronous condition between said engagement inner and said engagement outer for shifting.

24. The engagement mechanism of claim 21 wherein said first sensor is positioned to directly read the rotational speed of said engagement inner.

25. The engagement mechanism of claim 21 wherein said second sensor is positioned to directly read the rotational speed of said engagement outer.

26. An engagement mechanism comprising an engagement inner having an inner race;

an engagement outer having an outer race, said inner race having cam surfaces inclined relative to said outer race;

wedging elements between said inner race and said outer race;

a cage between said inner race and said outer race, said cage retaining said wedging elements and being angularly movable relative to said cam surfaces to selectively couple said engagement inner and said engagement outer through said wedging elements, said cage having a first actuator portion;

an actuator angularly fixed relative to said cam surfaces and having a second actuator portion, said actuator being movable relative to said cage to selectively engage said first and second actuator portions to angularly displace said cage relative to said cam surfaces;

a friction member functionally positioned between said cage and said engagement outer; and a control member movably mounted on said cage and operatively linked to said actuator to selectively frictionally engage said cage with said engagement outer.

27. The engagement mechanism of claim 26 wherein said friction member is angularly fixed to said cage.

28. The engagement mechanism comprising an engagement inner having an inner race;

an engagement outer having an outer race, said inner race having cam surfaces inclined relative to said outer race;

wedging elements between said inner race and said outer race;

a cage between said inner race and said outer race, said cage retaining said wedging elements and being angularly movable relative to said cam surfaces to selectively couple said engagement inner and said engagement outer through said wedging elements, said cage having a first actuator portion;

an actuator angularly fixed relative to said cam surfaces and having a second actuator portion, said actuator being movable relative to said cage to selectively engage said angularly displace said cage relative to said cam surfaces; and control means for preventing disengagement of said first actuator portion and said second actuator portion when said engagement inner and said engagement outer are not substantially synchronized, said control means including a control member positioned between said actuator and said cage, said control member having an opening therein, one of said first actuator portion and said second actuator portion being received by said opening and having an engagement shoulder facing a away from the other of said first actuator portion and said second actuator portion, said control member having a locking shoulder adjacent said opening to face and selectively interlock with said engagement shoulder.

29. An engagement mechanism comprising an engagement inner having an inner race;

an engagement outer having an outer race, said inner race having cam surfaces inclined relative to said outer race;

wedging elements between said inner race and said outer race;

a cage between said inner race and said outer race, said cage retaining said wedging elements and being angularly movable relative to said cam surfaces to selectively couple said engagement inner and said engagement outer through said wedging elements, said cage having a first actuator portion;

an actuator angularly faced relative to said cam surfaces and having a second actuator portion, said actuator being movable relative to said cage to selectively engage said first actuator portion and said second actuator portion to angularly displace said cage relative to said cam surfaces;

control means for preventing disengagement of said first actuator portion and said second actuator portion when said engagement inner and said engagement outer are not substantially synchronized, said control means including a first sensor to sense the speed of said engagement inner, a second sensor to sense the speed of said engagement outer, a computer receiving signals from said first and second sensors, actuator control means operatively controlled by said computer to move said actuator at near synchronous speeds of said engagement inner and said engagement outer.

30. An engagement mechanism for a multi-ratio transmission, comprising a engagement inner having a first inner race and a second inner race;

a first engagement outer having a first outer race;

a second engagement outer having a second outer race, said outer races being circular and said inner races having cam surfaces inclined relative to said outer races;

wedging elements between said inner races and said outer races;

a first cage between said first inner race and said first outer race;

a second cage between said second inner race and said second outer race, said first cage and said second cage retaining said wedge elements and being angularly movable relative to said cam surfaces to selectively couple said engagement inner and said first engagement outer and said engagement inner and said second engagement outer, respectively, through said wedging elements, said first cage and said second cage having a first actuator portion and a second actuator portion, respectively;

an actuator angularly fixed relative to said cam surfaces and having a third actuator portion and a fourth actuator portion, said actuator being movable relative to each of said cages to selectively engage said first and second actuator portions with said third and fourth actuator portions, respectively, to angularly displace said cages relative to said cam surfaces;

first control means for preventing disengagement of said first actuator portion and said third actuator portion when said engagement inner and said first engagement outer are not substantially synchronized, said first control means including a first control member positioned between said actuator and said first cage, said first control member having a first opening therein, one of said first actuator portion and said third actuator portion being received by said first opening and having a first engagement shoulder facing away from the other of said first actuator portion and said third actuator portion, said first control member having a first locking shoulder adjacent said first opening to face and selectively interlock with said first engagement shoulder; and second control means for preventing disengagement of said second actuator portion and said fourth actuator portion when said engagement inner and said second engagement outer are not substantially synchronized, said second control means including a second control member positioned between said actuator and said second cage, said second control member having a second opening therein, one of said second actuator portion and said fourth actuator portion being received by said second opening and having a second engagement shoulder facing away from the other of said second actuator portion and said first actuator portion, said second control member having a second locking should adjacent said second opening to face and selectively interlock with said second engagement shoulder.

31. The engagement mechanism of claim 30 wherein full engagement of said first actuator portion and said third actuator portion position said first cage to mutually disengage said engagement inner and said first engagement outer and full engagement of said second actuator portion and said fourth actuator portion positions said second cage to mutuallly disengage said engagement inner and said engagement outer, at least one or the other or both of said first actuator portion and said second actuator portion are fully engaged with said third actuator portion and said fourth actuator portion, respectively.

32. The engagement mechanism of claim 30 further comprising a rotatably mounted shaft, said engagement inner being positioned on said shaft and fixed to rotate therewith, said first engagement outer including a first gear rotatably mounted therewith and said second outer includes a second gear rotatably mounted therewith, said first and second gears being of different diameters, and a cluster gear including a third gear and a fourth gear thereon in constant meshing with said first gear and said second gear, respectively.

33. An engagement mechanism for a multi-ratio transmission, comprising an engagement inner having a first inner race and a second inner race;

a first engagement outer having a first outer race;

a second engagement outer having a second outer race, said outer races being circular and said inner races having cam surfaces inclined relative to said outer races;

wedging elements between said inner races and said outer races;

a first cage between said first inner race and said first outer race;

a second cage between said second inner race and said second outer race, said first cage and said second cage retaining said wedging elements and being angularly movable relative to said cam surfaces to selectively couple engagement inner and said fist engagement outer and said engagement inner and said second engagement outer, respectively, through said wedging elements, said first cage and said cage having a first actuator portion and a second actuator portion, respectively;

an actuator angularly fixed relative to said cam surfaces and having a third actuator portion and a fourth actuator portion, said actuator being movable relative to each of said cages to selectively engage said first and second actuator portions with said third and fourth actuator portions, respectively, to angularly displace said cages relative to said cam surfaces;

first control means for preventing disengagement of said first actuator portion and said third actuator portion when said engagement inner and said first engagement outer are not substantially synchronized, said first control means including a first sensor to sense the speed of said engagement inner, a second sensor to sense the speed of said first engagement outer, a computer receiving signals from said first and second sensors, actuator control means operatively controlled by said computer to move said actuator at near are synchronous speeds of said engagement inner and said first engagement outer; and second control means for preventing disengagement of said second actuator portion and said fourth actuator portion when said engagement inner and said second engagement outer are not substantially synchronized, said second control means including a third sensor to sense the speed of said second engagement outer, said actuator control means being operatively controlled by said computer to move said actuator at near synchronous speeds of said engagement inner and said second engagement outer.

34. The engagement mechanism of claim 33 wherein full engagement of said first actuator portion and said third actuator portion position said first cage to mutually disengage said engagement inner and said first engagement outer and full engagement of said second actuator portion and said fourth actuator portion positions said second cage to mutually disengage said engagement inner and said second engagement outer, at least one or the other or both of said first actuator portion and said second actuator portion are fully engaged with said third actuator portion and said fourth actuator portion, respectively.

35. The engagement mechanism of claim 33 further comprising a rotatably mounted shaft, said engagement inner being positioned on said shaft and fixed to rotate therewith, said first engagement outer including a first gear rotatably mounted therewith and said second outer includes a second gear rotatably mounted therewith, said first and second gears being of different diameters, and a cluster gear including a third gear and a fourth gear thereon in constant meshing with said first gear and said second gear, respectively.

* * * * *

UNITED STATES PATENT AND TRADEMARK OFFICE
CERTIFICATE OF CORRECTION

PATENT NO. : 4,817,451
DATED : April 4, 1989
INVENTOR(S) : PETER H. WEISMANN

It is certified that error appears in the above-identified patent and that said Letters Patent is hereby corrected as shown below:

IN CLAIM 1:

In column 9, line 21, delete "faced" and insert therefor -- faces --.

IN CLAIM 2:

In column 9, line 35, delete "in".

IN CLAIM 11:

In column 10, line 67, after "slot" insert --, said dog having an engagement shoulder facing away from said slot --.

In column 11, line 4, delete "surface" and insert therefor -- surfaces --.

IN CLAIM 16:

In column 11, line 34, after "angularly" insert -- movable relative to said cam surfaces to selectively --.

In column 11, line 46, delete ". Respec-" and insert therefor -- , respec- --.

UNITED STATES PATENT AND TRADEMARK OFFICE
CERTIFICATE OF CORRECTION

PATENT NO. : 4,817,451 -
DATED : April 4, 1989
INVENTOR(S) : Peter H. Weismann

It is certified that error appears in the above-identified patent and that said Letters Patent is hereby corrected as shown below:

IN CLAIM 19:

In column 12, line 22, after "being" insert -- of --.

IN CLAIM 20:

In column 12, line 35, delete "and" and insert therefor -- said --.

In column 12, line 37, delete "coupling" and insert therefor -- couple --.

IN CLAIM 28:

In column 13, line 62, delete "The" and insert therefor -- An --.

In column 14, line 10, after "said" (first occurrence) insert -- first actuator portion and said second actuator portion to --.

In column 14, line 21, delete "a".

UNITED STATES PATENT AND TRADEMARK OFFICE
CERTIFICATE OF CORRECTION

PATENT NO. : 4,817,451 -
DATED : April 4, 1989
INVENTOR(S) : Peter H. Weismann

It is certified that error appears in the above-identified patent and that said Letters Patent is hereby corrected as shown below:

IN CLAIM 29:

In column 14, line 40, delete "faced" and insert therefor -- fixed --.

IN CLAIM 30:

In column 15, line 50, delete "first" and insert therefor -- fourth --.

In column 15, line 51, delete "should" and insert therefor -- shoulder --.

IN CLAIM 31:

In column 15, line 62, after "said" insert -- second --.

IN CLAIM 33:

In column 16, line 26, after "couple" insert -- said --.

UNITED STATES PATENT AND TRADEMARK OFFICE
CERTIFICATE OF CORRECTION

PATENT NO. : 4,817,451

DATED : April 4, 1989

INVENTOR(S) : Peter H. Weismann

It is certified that error appears in the above-identified patent and that said Letters Patent is hereby corrected as shown below:

In column 16, line 30, after "said" insert -- second --.

Signed and Sealed this

Sixteenth Day of January, 1990

*Attest:*

JEFFREY M. SAMUELS

*Attesting Officer*        *Acting Commissioner of Patents and Trademarks*